United States Patent [19]

Duffield

[11] Patent Number: 4,914,516

[45] Date of Patent: Apr. 3, 1990

[54] FAST RESPONSE PICTURE-IN-PICTURE CIRCUITRY

[75] Inventor: David J. Duffield, Indianapolis, Ind.

[73] Assignee: Thomson Consumer Electronics, Inc., Indianapolis, Ind.

[21] Appl. No.: 340,948

[22] Filed: Apr. 20, 1989

[51] Int. Cl.⁴ .................. H04N 5/272; H04N 5/50; H04N 5/44

[52] U.S. Cl. .................. 358/183; 358/195.1; 358/188

[58] Field of Search ............ 358/181, 182, 183, 191.1, 358/195.1, 194.1, 188, 22

[56] References Cited

U.S. PATENT DOCUMENTS

| | | | |
|---|---|---|---|
| 4,623,915 | 11/1986 | Bolger | 358/183 |
| 4,665,438 | 5/1987 | Miron et al. | 358/183 |
| 4,821,121 | 4/1989 | Beaulier | 358/183 |

OTHER PUBLICATIONS

Owner's Manual for RCA VPT 695 HF Video Cassette Recorder, p. 28.
CTC 140 Color TV Chassis Technical Training Manual, p. 21.

*Primary Examiner*—John K. Peng
*Attorney, Agent, or Firm*—Joseph S. Tripoli; Peter M. Emanuel; Thomas F. Lenihan

[57] ABSTRACT

A channel sampler system, including a television signal tuner, displays an array of inset pictures on a display screen. Each inset picture is a still video picture (i.e., freeze-frame) selected by tuning each of the channels in a scan list of channels. A feedback signal is used to determine the point at which the channel is tuned, at which point a frame of video is received and stored, so that the television program sample freeze-frame image is taken from each active channel without undue delay.

9 Claims, 6 Drawing Sheets

FAST RESPONSE PICTURE-IN-PICTURE CIRCUITRY

FIELD OF THE INVENTION

This invention relates to the field of television receivers having picture-in-picture capability.

BACKGROUND OF THE INVENTION

The term "television receiver" as used herein includes television receivers having a display device (commonly known as television sets), and television receivers without a display device, such as videocassette recorders (VCR's).

The term "television receiver" as used herein also includes television monitor/receivers having an RF tuner and baseband signal input circuitry.

Many modern television receivers have picture-in-picture (PIP, or PIX-IN-PIX) capability, that is, the capability to receive video signals from two different sources and combine them to produce a signal which when displayed includes a first program in a main viewing area, and a second program in a secondary (inset) viewing area of the same display screen.

It is known in the art to produce a multi-picture (multipix) display be generating a 3×3 or 3×4 matrix of small still (i.e., freeze-frame) pictures. These small still pictures are produced by storing a series of "snap-shot-like" still images to form a display of pictures having a fixed time interval between frames.

It is also known to use the multipix technique to display an array of still inset images representative of the programs on each of the channels included in a scan list stored in memory. These messages are produced by initiating the tuning of a channel, waiting a predetermined time while the tuner performs the the tuning operation, storing a frame of video from that channel, tuning the next channel from the scan list, and so on. A 3×4 matrix of images of this type, captured from 12 television channels, is illustrated in prior art FIG. 3. Such a system is known from the RCA VPT-695 videocassette recorder, sold by Thomson Consumer Electronics, Inc., Indianapolis, Ind.

In the U.S., television channels are allocated to respective radio frequencies in accordance with one of three different standards. Broadcast television frequencies are assigned and regulated by the Federal Communications Commission (FCC). Cable companies, however, employ a second standard by which some cable channel frequencies are slightly offset from the FCC broadcast frequency standards, or a third standard by which some cable channel frequencies are grossly offset from the FCC broadcast frequency standards. So-callled cable ready television receivers use a search algorithm to locate the offset cable channels. Not surprisingly, tuning a grossly offset cable channel via a search algorithm takes longer (up to approximately 1 second total time), than tuning an FCC standard broadcast channel. Understandibly, the tuner settling time delay of approximately 1 second used by the RCA VPT-695 allows for the longest tuning time required. Thus, in that system, filling a 3×4 matrix with freeze-frame images from different channels takes about 12 seconds, which may be an undesirably long time for the user to wait.

SUMMARY OF THE INVENTION

A channel sampler system, including a television signal tuner, displays an array of inset pictures on a display screen. Each inset picture is a still video picture (i.e., freeze-frame) selected by tuning each of the channels in a scan list of channels. A feedback signal is used to determine the point at which the channel is tuned, at which point a frame of video is received and stored. Thus, a television program sample freeze-frame image is taken from each active channel without undue delay.

DETAILED DESCRIPTION OF THE EMBODIMENT

Figure 1:
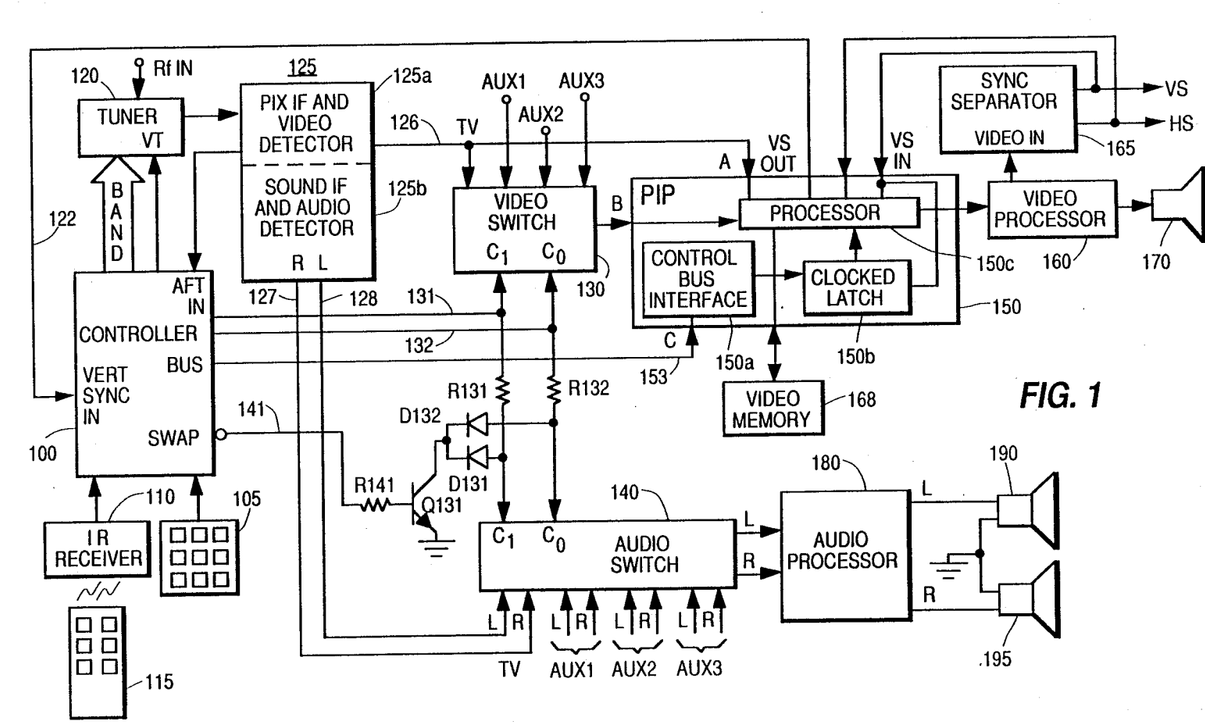
FIG. 1 illustrates, in block diagram form, an embodiment of the invention.

Referring to FIG. 1, a controller 100 receives user-entered control signals from a local keyboard 105 and from an infrared (IR) receiver 110. IR receiver 110 receives and decodes remote control signals transmitted by a remote control unit 115. Controller 100, which may be a microprocessor or microcomputer, causes a television tuner 120 to select a particular RF signal to be tuned in response to data entered by a user. Tuner 120 produces a signal at an intermediate frequency (IF) and applies it to a processing unit 125 comprising a first section 125a including a picture (PIX) amplifying stage an AFT circuit, and video detector, and a second section 125b including, a sound amplifying stage, an audio detector and a stereo decoder. Processing unit 125 produces a baseband video signal (TV), and baseband left and right audio signals. The AFT circuit of processing unit 125 also produces a signal from which AFT crossover is detected and applies it via line 124 to controller 100, as will be explained in detail below.

The baseband video signal (TV) is coupled via line 126 to one input of a four input video switch 130. The baseband left and right audio signals are applied to one pair of inputs of an audio switch 140 capable of selecting a pair of inputs from four pairs of audio inputs. Video switch 130 and audio switch 140 each have three other inputs labelled AUX1, AUX2, and AUX3, for receiving respective baseband video and audio signals from external sources. Each of the inputs of video switch 130 and audio switch 140 is slectable in response to binary signals generated by controller 100 and applied to control inputs $C_1$ and $C_0$ via conductors 31 and 32, respectively. For example, if $C_1$ and $C_0$ are both caused to be at a low signal level (i.e. binary 00), then the TV input is selected. If $C_1$ is low and $C_0$ high (binary 01), then AUX1 is selected. If $C_1$ is high and $C_0$ low (binary 10), then AUX2 is selected. If both $C_1$ and $C_0$ are high (binary 11), then AUX3 is selected. The selection of corresponding videoand audio signals is ensured because the control lines 131 and 132 are coupled to respective control inputs $C_1$ and $C_0$ of both video switch 130 and audio switch 140.

The selected video signal is applied to a video processor unit 160 and ultimately displayed on a display screen of a display device 170. Video signals are also applied to a sync separator unit 165 whch derives vertical and horizontal synchronizing signals therefrom. The selected audio signals are applied to an audio processor unit 180 and ultimately reproduced via speakers 190, 195. The above-described circuitry is essentially known from the RCA CTC-140 television receiver manufactured by Thomson Consumer Electronics, Indianapolis, Ind.

In accordance with the present invention, a picture-in-picture (PIP) unit 150 is shown inserted between video switch 130 and video processor 160. The A signal input of PIP unit 150 is connected to receive baseband signals from the built-in tuner/IF circuitry of the television receiver, and the B signal input is connected to receive the output signal video switch 130. PIP unit 150 has a VS IN input for receiving vertical rate synchronizing signals and an HS IN input for receiving horizontal rate synchronizing signals from sync separator unit 165. Sync separator unit 165 also couples vertical synchronizing signals to a VERT SYNC IN terminal of controller 100 via a line 122. PIP unit 150 has a control input C to which a serial control bus 153 is coupled. Serial control bus 153 couples command data from controller 100 which controls PIP unit 150 to produce an image for display having a main (or primary) picture and an inset (or secondary) picture. Under controller command, via serial bus 153, the PIP function may be enabled and disabled, and the inset picture may be displayed, for example, in each of the four corners, or in several other areas. PIP unit 150 includes a control bus interface 150a, a latch 150b and a processing unit 150c. Latch 150b allows incoming processor commands to be synchronized at the vertical rate. Also under controller command via serial bus 153, PIP unit 50 may be controlled to interchange (swap) the main and inset television images. The sound reproduced by speakers 190, 195 desirably "follows" (i.e., is the sound associated with) the image displayed as the main picture.

The structure of FIG. 1 provides for selection of an audio signal in response to control signals applied to parallel-connected control inputs $C_1$ and $C_0$ of video signal switch 130 and audio signal switch 140, and also in response to a signal indicative of whether the main and inset picture are swapped. This is accomplished by circuitry comprising resistors R131, R132, diodes D131, D132, transistor Q131, and a swap control line 141. The operation of the audio selection circuitry is not relevant to the subject invention, and therefore does not need to be described in detail.

Figure 2:
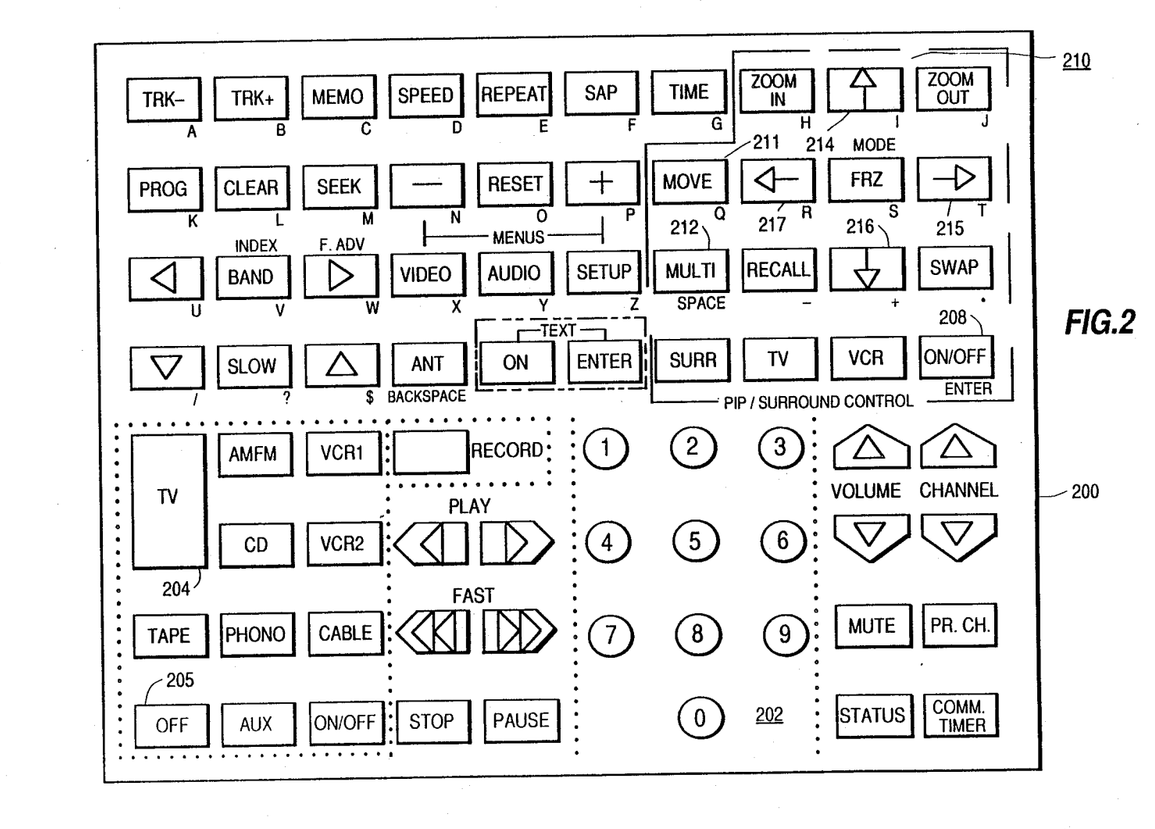
FIG. 2 illustrates a remote control handunit.

IR receiver 110 receives IR signals transmitted by, for example, a remote control handunit such as the one shown in FIG. 2 and designated 200. Referring to FIG. 2, remote control handunit 200 includes keys 202 for entering the digits 0–9, for entering "channel-up" and "channel-down" commands and a key 204 for turning the receiver "on" and a key 205 for turning the receiver "off." Remote control handunit 200 also includes an array of keys 210 (labelled PIP/SURROUND CONTROL) including a key 208 (labelled ON/OFF), a key 211 (labelled MOVE), and a key 212 (labelled MULTI), the operation of which will be described below. Remote control handunit 200 includes therein electronic circuitry (not shown) for encoding a signal to be transmitted by an IR diode in accordance with the particular keys pressed.

When a user presses MULTI key 212 controller 100 controls PIP unit 150 via serial bus 153 to enter the "channel sample" mode mentioned above. In the channel sample mode of operation, controller 100 supplies band selection and tuning signals to cause tuner 120 to tune the lowest channel stored in a scan list previously stored in memory by a user, or possibly the lowest channel in a list of active channels as determined by a previously activated search for active channels (i.e., autoprogramming). When each channel is tuned (for example, while the automatic fine tuning (AFT) circuitry is locking the video intermediate frequency (IF) signal to its nominal position (45.75 MHz in the U.S.), processing unit 125 generates a feedback signal (AFT CROSSOVER), and applies it via line 124 to an input terminal AFT of controller 100.

Controller 100 monitors the AFT terminal, and upon detecting the polarity change of the AFT CROSSOVER signal, causes PIP unit 150 to acquire and store, in video memory 158, a frame of video from the video signal applied to its A input (TV). After issuing the acquire command, controller 100 delays for 50 milliseconds to ensure that a full frame of video has been stored. Controller 100 can then cause tuner 120 to select a second channel. The channel sampler system of the present invention is operating in a closed loop manner by using the AFT CROSSOVER signal as a feedback signal indicative of a completed-tuning condition, resulting in a system which is able to fill up the individual inset screens in the display of the channel sample mode, up to 4 times faster than prior art systems, when sampling FCC broadcast standard channels.

Figure 3:
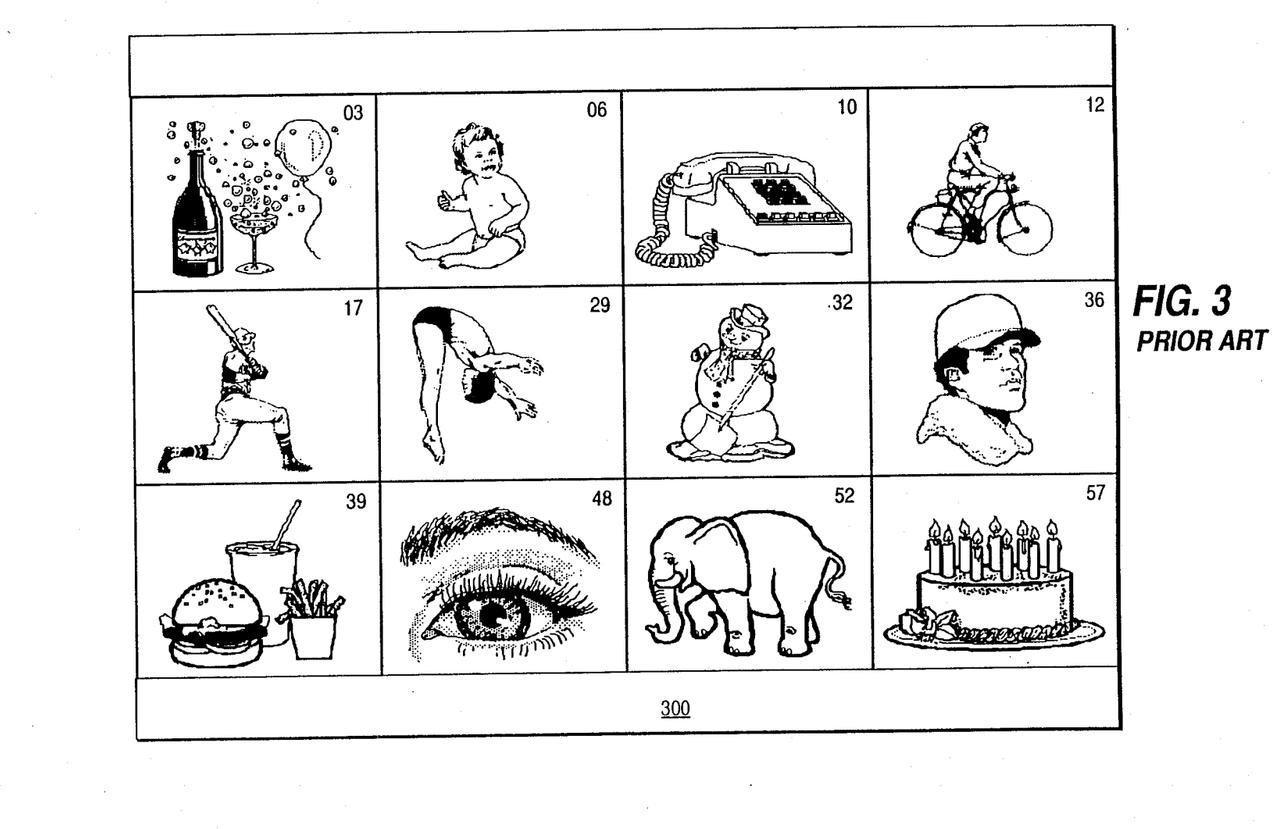
FIG. 3 illustrates a 3×4 matrix of images known from the prior art, but useful in understanding the invention.

Although, PIP unit 150 is capable of producing $2\times2$, $3\times3$, $3\times4$, $4\times4$, and $6\times6$ matrices of images, the subject system uses a $3\times4$ matrix for the channel sampler function, as shown in FIG. 3. A $3\times4$ matrix of images is felt to produce a pleasing and useful display for the channel sampler function. In the event that there are more than 12 active channels in the television receiver's scan list, PIP unit 150 can provide separate "pages" of multiple channel sample images by taking samples from the next 12 channels in the scan list in response to a second press of MULTI key 212 of keyboard. The first 12 images are preferably not stored in memory while the second 12 are displayed, in order to reduce the amount of memory that would be required.

Figure 4:
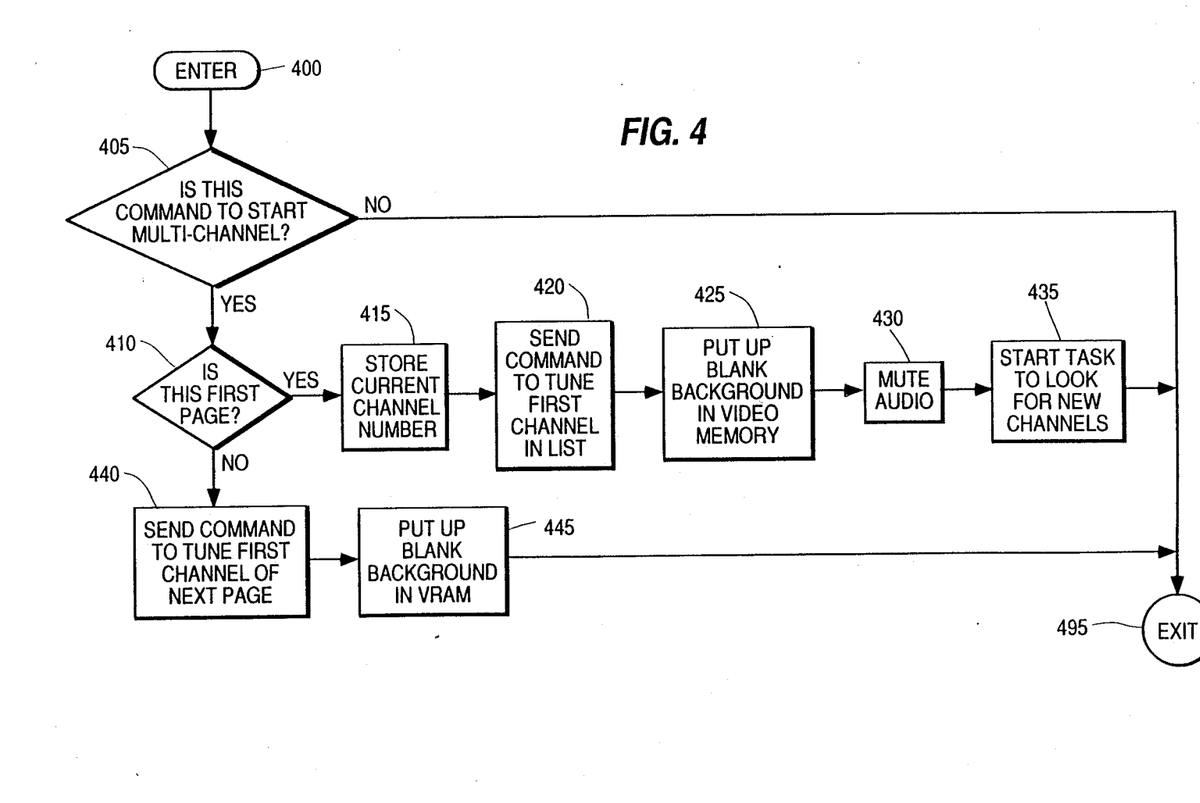
FIGS. 4 and 5 illustrate flowcharts showing portions of a control program for the microcomputer of FIG. 1.

The flowchart of FIG. 4 is entered at step 400 from the keyboard decoding routines. At step 405 a determination is made as to whether the received keycode is the MULTI keycode. If not, the routine is exited at step 495. The MULTI keycode has been received, then the YES path is taken to decision diamond 410 where a check is made to see if this is the first page of images (i.e., pictures from the first 12 channels in the scan list). If so, the channel number of the currently tuned channel is stored (step 415). A command is sent to tuner 120 to begin tuning the first channel in the scan list (step 420). Video memory 168 is cleared to a blank background (step 425), the audio is muted (step 430), controller 100 begins the task of looking for new channels (step 435), and the routine is exited. The task of beginning to look for new channels entails setting a flag, such that whenever a new channel is tuned, the program segment illustrated in the flowchart of FIG. 5 will be executed. If at step 410 it was decided that this was not the first page of images, then the NO path is taken to step 440. At step 440 controller 100 issues a command to tuner 120 to begin tuning the first channel in the next set of 12 channels in the scan list. In step 445 video memory 168 is cleared to a blank background and the program is exited.

Figure 5:
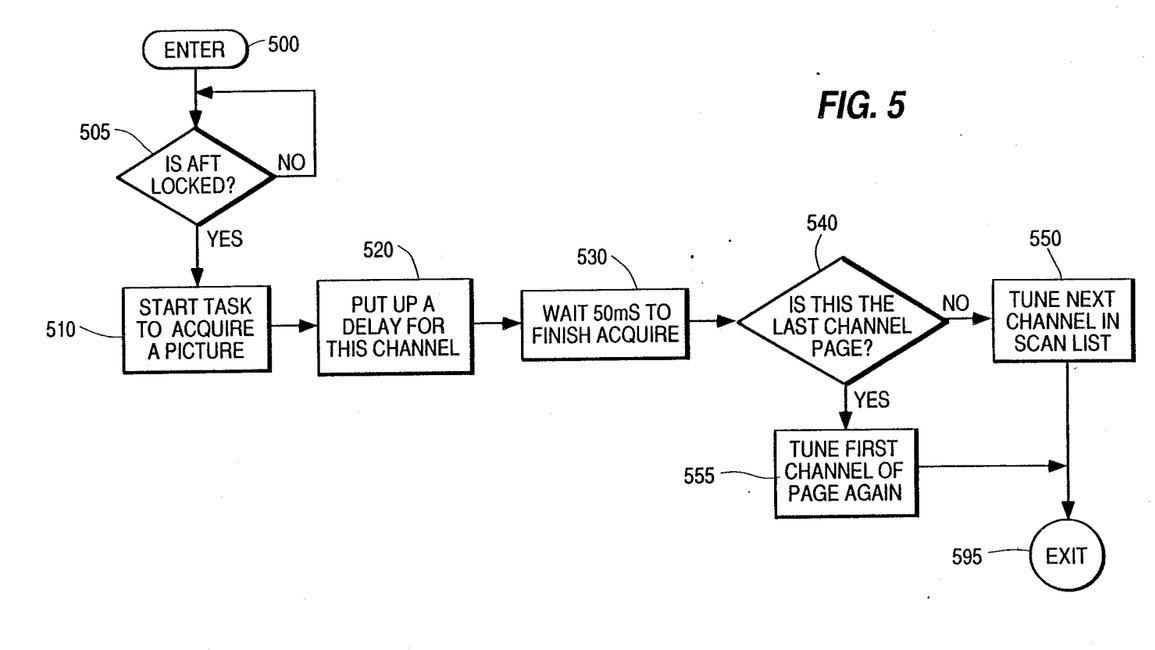

The routine, illustrated in FIG. 5, to process new channels during the channel sampler mode is entered at step 500 from the new channel number routines. At step 505 a decision is made as to whether the automatic fine tuning (AFT) has locked (i.e., is the new channel fully tuned?). If not, then the program loops until the AFT is locked, at which point the YES path is taken to step 510. At step 510, the acquire command is sent to PIP unit 150, and the program is advanced to step 520. In step 520, a channel number is displayed for the currently tuned channel (as shown in the upper right corner of the individual images of FIG. 3). At step 530 a 50 millisecond delay is executed to ensure that a full frame of video is acquired. A decision is made at step 540 as to whether this is the last channel of the page. If not, the next channel in the scan list is tuned (step 550). If so, the first channel of the current page is tuned (step 555), and the routine is exited at step (595).

Figure 6:
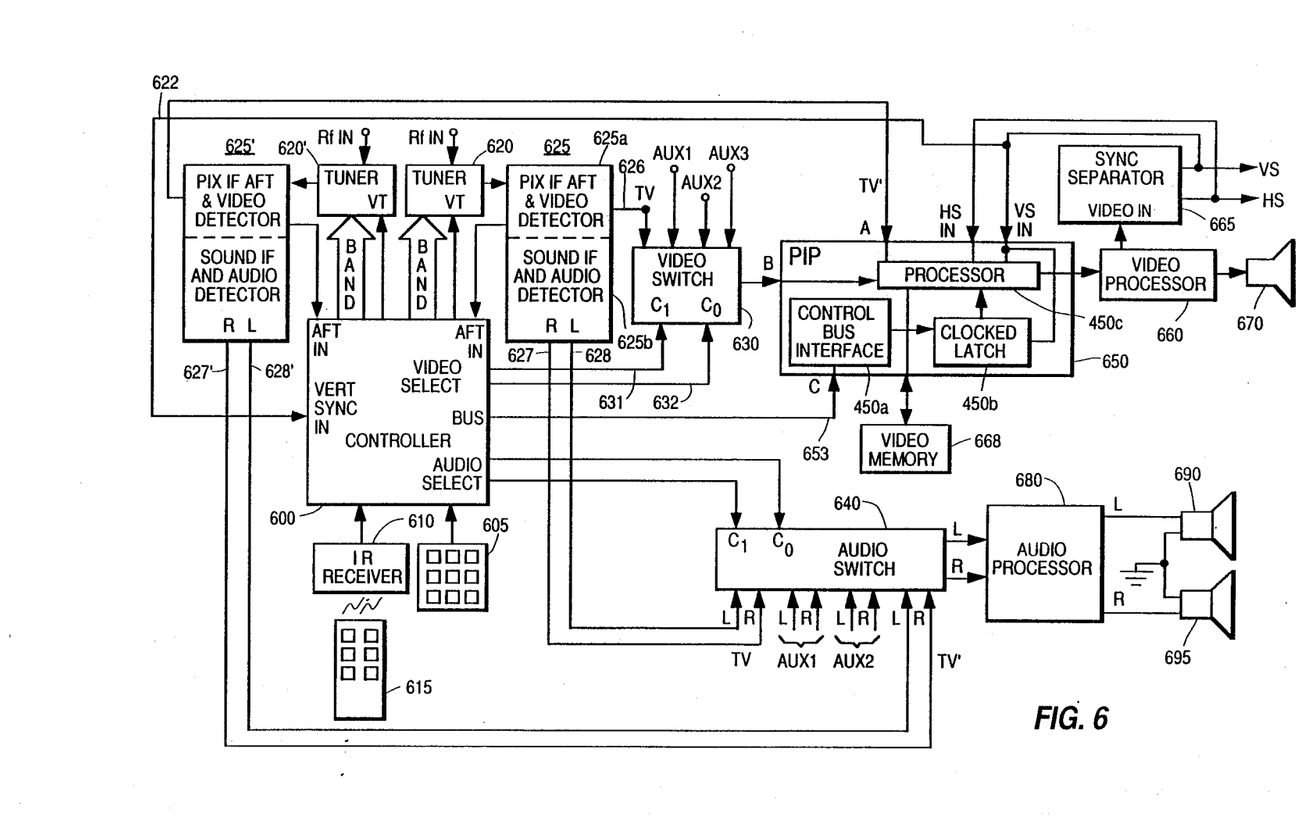
FIG. 6 illustrates, in block diagram form, another embodiment of the invention.

A two-tuner embodiment of the invention is shown in FIG. 6. Elements of the additional tuner bear primed reference numbers otherwise identical to the reference numbers of the first tuner. Those elements of FIGS. 1 and 6 which bear similar reference numbers, serve the same function and therefore need not be described again in detail. In this embodiment the diode audio select logic is removed and audio selection is controlled directly by controller 600.

The video signal TV' produced by processing unit 625' is applied directly to the A input of PIP unit 650. The audio signal TV' produced by processing unit 625' is applied to audio switch 640. Controller 600 controls audio switch 640 such that when the main picture is the video corresponding to TV', then the TV' audio is selected. Note that both processing unit 625 and processing unit 625' have AFT signals coupled to controller 600 at input terminals AFT and AFT', respectively. These AFT signals indicate the completion of the tuning of channels at the respective tuners.

By use of this arrangement, the channel sampler can take one channel sample from each of tuners 620 and 620' and thus fill the channel sample display even more quickly than can the arrangement of FIG. 1.

Although the use of the AFT LOCK signal is set forth in the above-described embodiment, one skilled in the art will quickly realize that other signals, such as a Valid Sync signal produced by synchronizing signal detection circuitry could also be used to practice the invention, because a Valid Sync signal is also indicative of the completion of the tuning process for a particular channel.

What is claimed is:

1. A picture-in-picture system for a television receiver, comprising:

data entry means for generating data signals in response to activation by a user;

tuner demodulator means having an input for receiving a plurality of radio frequency signals, and having a control input for receiving a first control signal, said tuner demodulator means tuning one of said radio frequency signals in response to said first control signal and producing a detected video signal therefrom at a first output, and having a second output for producing a first feedback signal indicative of the completion of the tuning of a television channel;

memory means having data representing a list of television channels stored therein;

picture-in-picture processing means coupled to said first output of said tuner demodulator means for receiving said detected video signal, for storing in response to a second control signal a predetermined amount of said video signal, and for producing a display signal which when displayed on a display screen produces a display comprising an image displayed in one of a plurality of image locations, said image being related to said stored video signal, control means for controlling said tuner demodulator means and for controlling said picture-in-picture processing means, said control means having a first input coupled to said data entry means for receiving said data signals, having a second input coupled to said tuner-demodulator means for receiving said feedback signal, having a first output for developing said first control signal, and having a second output for developing said second control signal;

said control means in response to said data signals generates said first output signal causing said tune-demodulator means to tune a first television channel from said list of television channels, and in response to said first feedback signal generates said second control signal causing said picture-in-picture processing means to store said predetermined amount of signal.

2. The system of claim 1 wherein said first feedback signal is an AFT signal.

3. The system of claim 1 wherein said first feedback signal is a signal indicative of the detection of a valid synchronizing signal component of a television signal.

4. A picture-in-picture system for a television receiver, comprising:

data entry means for generating data signals in response to activation by a user;

first tuner demodulator means having an input for receiving a plurality of radio frequency signals, and having a control input for receiving a first control signal, said tuner demodulator means tuning one of said radio frequency signals in response to said first control signal and producing a first detected video signal therefrom at a first output, and having a second output for producing a first feedback signal indicative of the completion of the tuning of a television channel;

second tuner demodulator means having an input for receiving a plurality of radio frequency signals, and having a control input for receiving a second control signal, said tuner demodulator means tuning one of said radio frequency signals in response to said second control signal and producing a second detected video signal therefrom at a third output, and having a fourth output for producing a second feedback signal indicative of the completion of the tuning of a television channel;

first memory means having data representing a first list of television channels stored therein;

second memory means having data representing a second list of television channels stored therein;

picture-in-picture processing means coupled to said first output of said first tuner demodulator means and coupled to said third output of said second tuner demodulator means for receiving said first and second detected video signals, for storing in response to a third control signal a predetermined amount of one of said video signals, and for producing a display signal which when displayed on a display screen produces a display comprising an image displayed in one of a plurality of image locations, said image being related to said stored video signal, control means for controlling said tuner demodulator means and for controlling said picture-in-picture processing means, said control means having a first input coupled to said data entry means for receiving said data signals, having a second input coupled to said first tuner-demodulator means for receiving said first feedback signal, having a third input coupled to said second tuner-demodulator means for receiving said second feedback signal, having a first output for developing said first control signal, having a second output for developing said second control signal and having a third output for developing said third control signal;

said control means in response to said data signals generates said first output signal causing said first tuner-demodulator means to tune a first television channel from said first list of television channels, and in response to said data signals generates said second output signal causing said second tuner-demodulator means to tune a second television channel from said second list of television channels, and in response to one of said first feedback signal and said second feedback signal generates said third control signal causing said picture-in-picture processing means to store said predetermined amount of signal.

5. The system of claim 4 wherein one of said first feedback signal and said second feedback signal is an AFT signal.

6. The system of claim 4 wherein one of said first feedback signal and said second feedback signal is a signal indicative of the detection of a valid synchronizing signal component of a television signal.

7. A picture-in-picture system for a television receiver, comprising:

data entry means for generating data signals in response to activation by a user;

tuner demodulator means having an input for receiving a plurality of radio frequency signals, and having a control input for receiving a first control signal, said tuner demodulator means tuning one of said radio frequency signals in response to said first control signal and producing a detected video signal therefrom at a first output, and having a second output for producing a first feedback signal indicative of the completion of the tuning of a television channel;

picture-in-picture processing means coupled to said first output of said tuner demodulator means for receiving said detected video signal, for storing in response to a second control signal a predetermined amount of said video signal, and for producing a display signal which when displayed on a display screen produces a display comprising an image displayed in one of a plurality of image locations, said image being related to said stored video signal, control means for controlling said tuner demodulator means and for controlling said picture-in-picture processing means, said control means having a first input coupled to said data entry means for receiving said data signals, having a second input coupled to said tuner-demodulator means for receiving said feedback signal, having a first output for developing said first control signal, and having a second output for developing said second control signal;

said control means in response to said data signals generates said first output signal causing said tuner-demodulator means to tune a first television channel, and in response to said first feedback signal generates said second control signal causing said picture-in-picture processing means to store said predetermined amount of signal.

8. The system of claim 7 wherein said first feedback signal is an AFT signal.

9. The system of claim 7 wherein said first feedback signal is a signal indicative of the detection of a valid synchronizing signal component of a television signal.

* * * * *